United States Patent [19]
Freed

[11] 3,718,342
[45] Feb. 27, 1973

[54] AMUSEMENT VEHICLE
[76] Inventor: Roy F. Freed, 3825 Airport Road, El Paso County, Colo. 80910
[22] Filed: Nov. 13, 1970
[21] Appl. No.: 89,285

[52] U.S. Cl. ............................. 280/87.01, 280/208
[51] Int. Cl. ........................................... B62k 9/11
[58] Field of Search ..................... 280/87.01, 208

[56] References Cited

UNITED STATES PATENTS

| 356,028 | 1/1887 | Brown | 280/208 |
| 2,909,145 | 10/1959 | De Hertelendy | 280/87.01 UX |
| 3,183,020 | 5/1965 | Hawver | 280/208 |

FOREIGN PATENTS OR APPLICATIONS

| 48,352 | 8/1889 | Germany | 280/208 |
| 150,456 | 11/1902 | Germany | 280/208 |

*Primary Examiner*—Leo Friaglia
*Attorney*—Richard W. Hanes

[57] ABSTRACT

The present invention relates generally to an amusement oriented vehicle comprising a pair of parallel spaced-apart wheels interconnected by a spindle about which the wheels rotate as an axis and including seat means carried by the spindle, said seat means being disposed between the two wheels and adapted to seat and carry a person.

1 Claim, 5 Drawing Figures

PATENTED FEB 27 1973

3,718,342

INVENTOR
ROY F. FREED
BY Richard W. Hansen
ATTORNEY

AMUSEMENT VEHICLE

A principal purpose of the present invention is to provide a riding device which comprises a new type of amusement for enjoyment by adults as well as children. Another purpose of the present invention is to provide a device comprising a generally cylindrically configurated vehicle having an enclosure within which a rider sits while the vehicle travels across the ground. Still another purpose of the present invention is to provide a riding device which is one form of the invention may incorporate additionally a steering mechanism so as to control the direction into which the device may travel.

Other and further purposes and objectives of the invention will become apparent upon a reading of the following detailed description of two embodiments of the invention taken in conjunction with the accompanying drawings in which.

Figure 1:
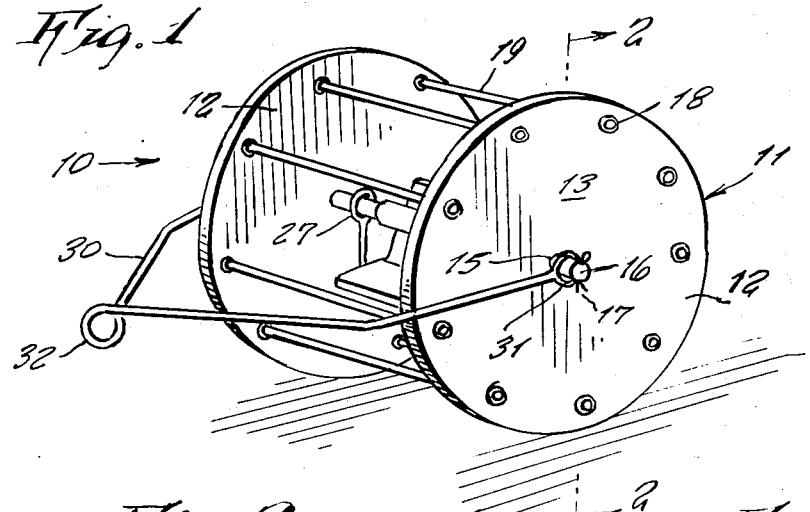
FIG. 1 is a perspective view of the preferred form of the present invention.
Figure 2:
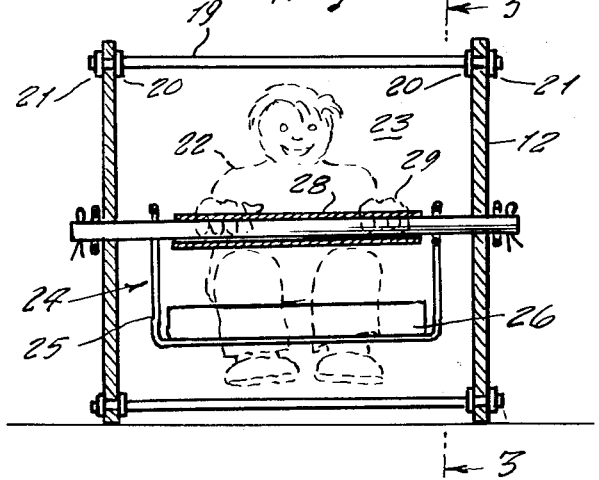
FIG. 2 is a cross-sectional view taken on the line 2—2 of FIG. 1 and shown occupied by a rider.
Figure 3:
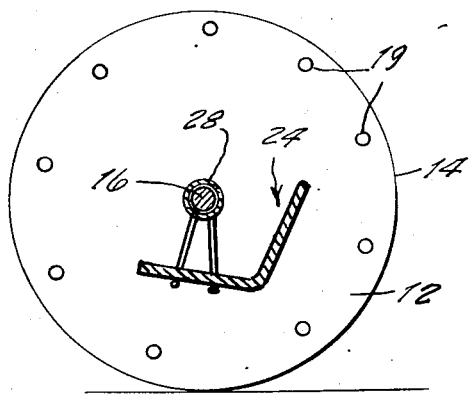
FIG. 3 is a cross-sectional view taken on the line 3—3 of FIG. 2.

Referring now to the drawing in detail, and more particularly to FIGS. 1 to 3 thereof, the reference numeral 10 represents a preferred form of the vehicle according to the present invention wherein the vehicle 11 is comprised of a pair of parallel, spaced-apart solid wheels 12, each one of which includes flat, parallel, opposite sides 13 which are bound around the circular periphery forming a rim 14 for the wheel 12. Each of the wheels has a central opening 15 through which there extends a cylindrical bar 16, the opposite end of the bar 16 being provided with cotter pins 17 extending therethrough and which are used for securing the wheels 12 to the bar 16.

Near the peripheral edges of the wheels there are provided a plurality of openings 18 within which are fitted a plurality of rudder bars 19 and which are used for maintaining the wheels in spaced apart relation as shown. The opposite ends of the spreader bars accordingly may be threaded or alternately designed so that each wheel 12 is secured between members 20 and 21 secured near the ends of the spreader bars. At least one of the spreader bars may be made removable from the openings 18 so as to permit a rider 22 to enter into the interior space 23 formed between the wheels 12. Upon the bar 16 there may be suspended a seat assembly 24 comprised of a U-shaped frame 25 upon which there is mounted a cushion 26 upon which the rider 22 may be seated.

The opposite ends of the U-shaped frame 25 are provided with loops or eyelets 27 for being fitted upon the bar 16, as is evident in FIGS. 1 and 2. A hand bar 28 can be fitted around a central portion of the bar 16, the hand bar 28 comprising simply a freely rotatable sleeve or tube which may be grasped by a rider's hands 29.

A generally U-shaped tow bar 30 is provided with an eye 31 at each opposite end so as to be fitted upon the ends of the bar 16 and being positioned between the outer side of the hoops and the cotter pins 17. The tow bar at its center includes an eye 32 for purpose of being secured to a towing vehicle such as a bicycle, a wagon or the like.

In operative use, the removable spreader bar is removed so to permit the rider 22 to enter the center area 23 and be seated upon the cushion 26 of the seat assembly 24. As shown in FIG. 2, the rider with his hands 29 may grasp conveniently the hand bar 28 so to support himself. The toy is then towed along by the towing vehicle while the rider travels within the rider hoop. Thus an exciting and different type of ride is provided. The hand bar 28 remains stationary within the rider's hand while the bar 16 may rotate.

Figure 4:
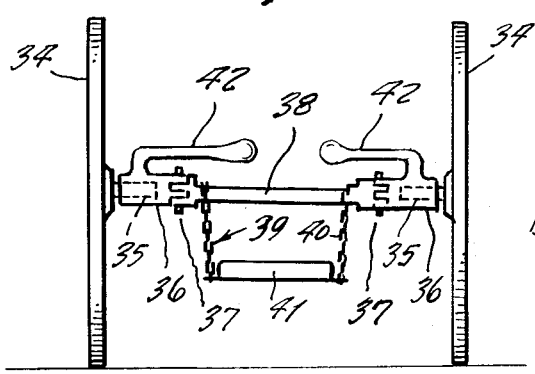
FIG. 4 is a front elevational view of a modified design of the invention which incorporates a novel steering mechanism.
Figure 5:
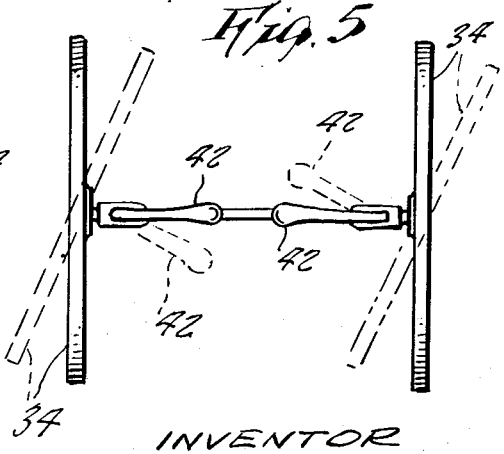
FIG. 5 is a top plan view thereof and showing in phantom lines an alternate position of the wheels being steered.

Referring now to FIGS. 4 and 5 of the drawing, there is provided a modified design of the vehicle wherein the assembly 33 includes a device that can be independently steered in direction by the rider 22 and wherein accordingly, if desired, the vehicle need not necessarily be towed but wherein the device can move independently by gravity force such as travelling down an inclined surface. In the present embodiment of the invention, each of the wheels 34 are integral with a short shaft 35 that is freely rotatable within a bearing block 36, each bearing block 36 being attached pivotly free by means of a transverse extending pin 37 to opposite ends of a central bar 38. The central bar 38 supports a seat assembly 34 as above described, or may support a seat assembly 39 comprised of a pair of chains 40 which at their lower ends support a seat 41. It is to be noted that each of the bearing blocks 36 are formed integrally with a sidewardly extending handle 42 which can be conveniently grasped within each hand of the rider. It is to be further noted that the handles 42 extend toward each other.

In use, the modified design of the amusement vehicle 33 may be steered by simply pulling or pushing the handle 42 of either wheel 34 until the wheel assumes a different travel direction as indicated by the phantom lines of FIG. 5. Thus, if one of the handles is pulled and the other is pushed in equal amounts, the wheels remain parallel to each other as indicated by the phantom lines so as to travel along a changed course.

An important feature of the present invention is that each of the wheels is independently steered so that they need not necessarily be kept parallel to each other. This feature is useful when desiring to brake the travel. In such a case, the wheels are made not parallel to each other so as to cause a braking action thus bringing the vehicle to slow down and to stop. Thus, there is provided a modified form of the invention having additional features for improved control and which would be more desirable particularly for older children or adults.

I claim:

1. An amusement vehicle for carrying persons including in combination:

a pair of spaced apart wheels having hubs;

spindle means extending inwardly from the said hubs;

spindle bearing means having a handle forming lever and hinge means;

a rigid bar interconnecting the said bearing means, each end of said bar having hinge means operatively interconnected with the bearing hinge means; and seat means carried by said interconnecting bar.

* * * * *